Figure 1:
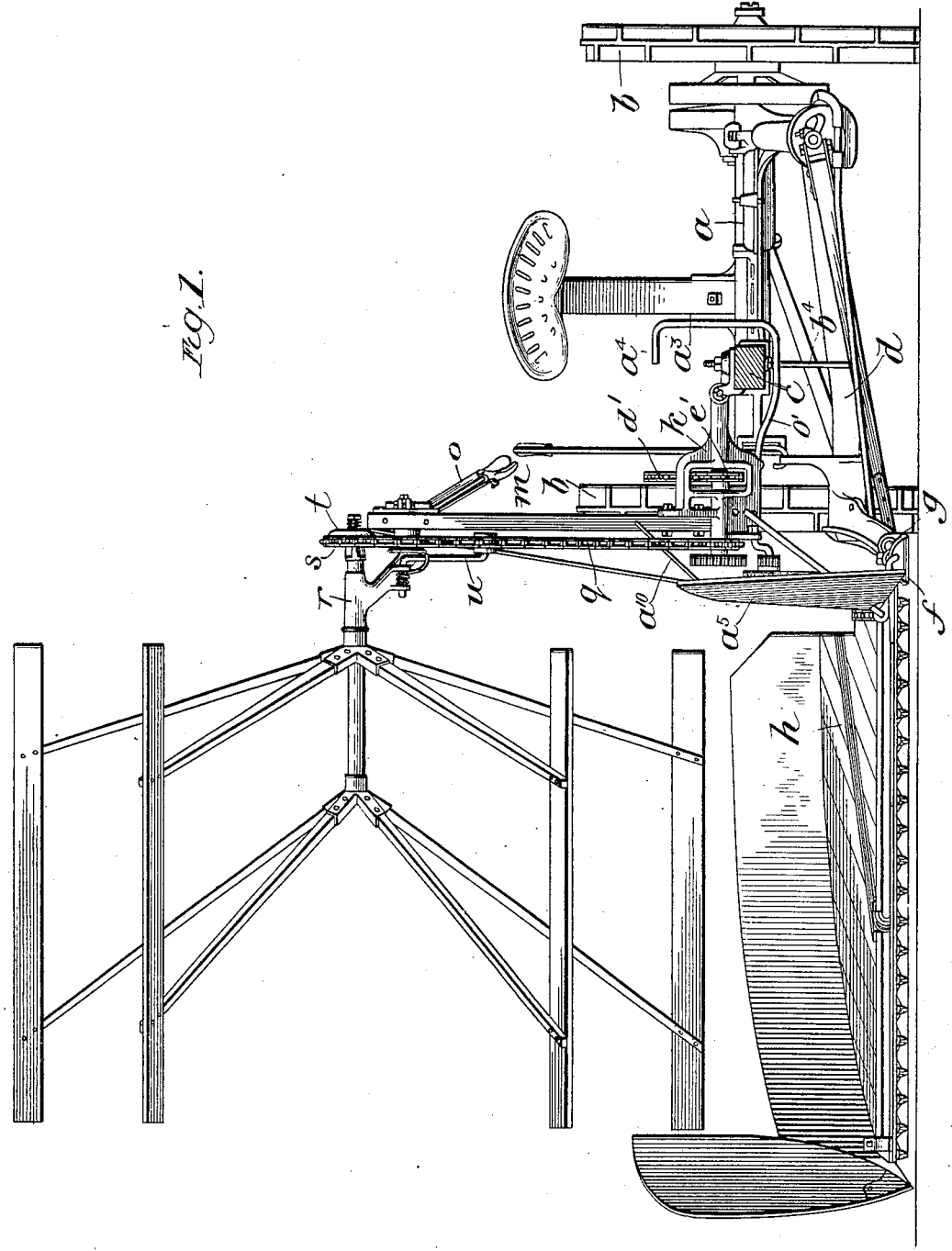

No. 763,902. PATENTED JUNE 28, 1904.
E. A. JOHNSTON.
FOLDING REEL SUPPORT FOR MOWERS.
APPLICATION FILED NOV. 30, 1903.
NO MODEL. 5 SHEETS—SHEET 1.

Witnesses
Inventor
E. A. Johnston
By his attys.

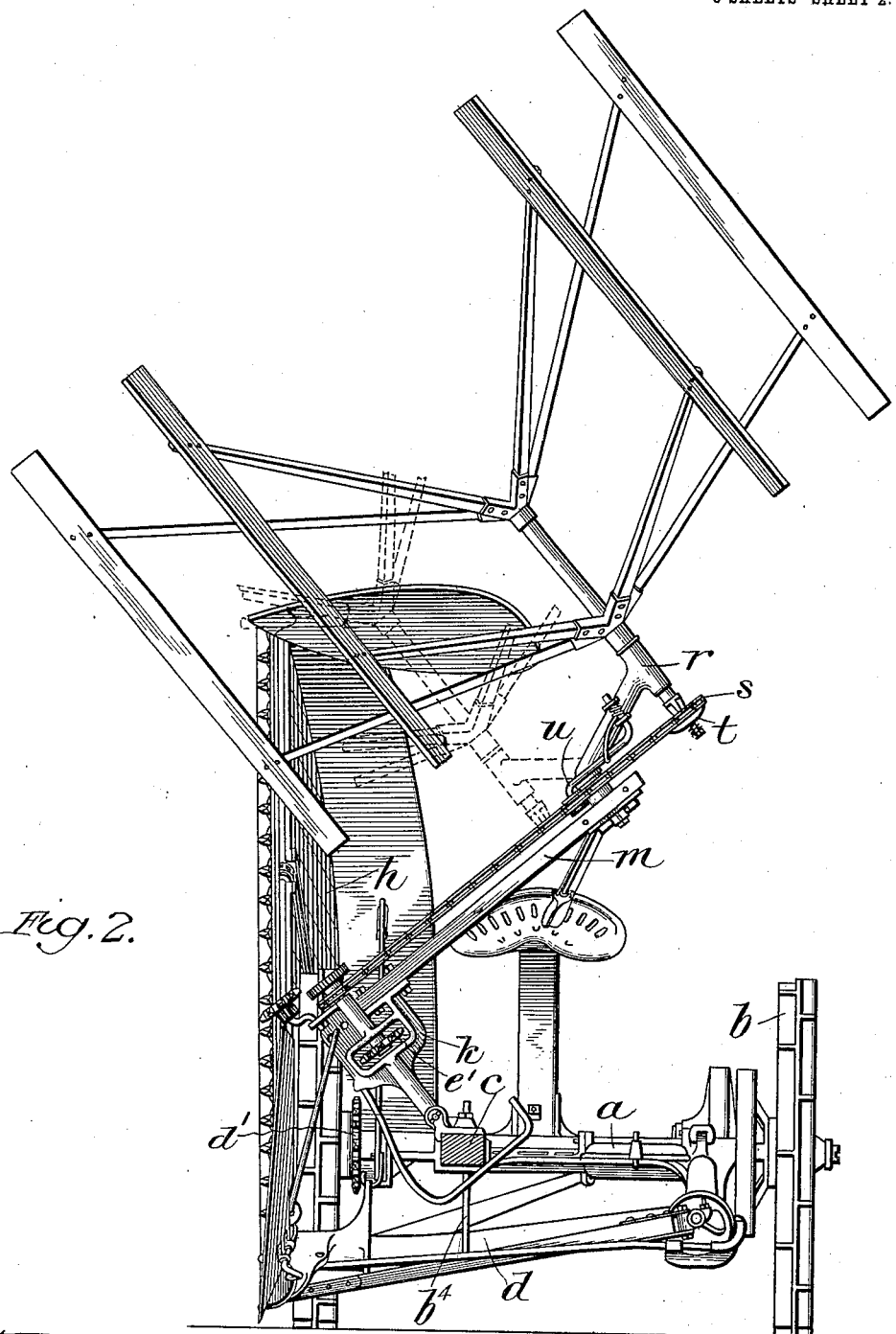

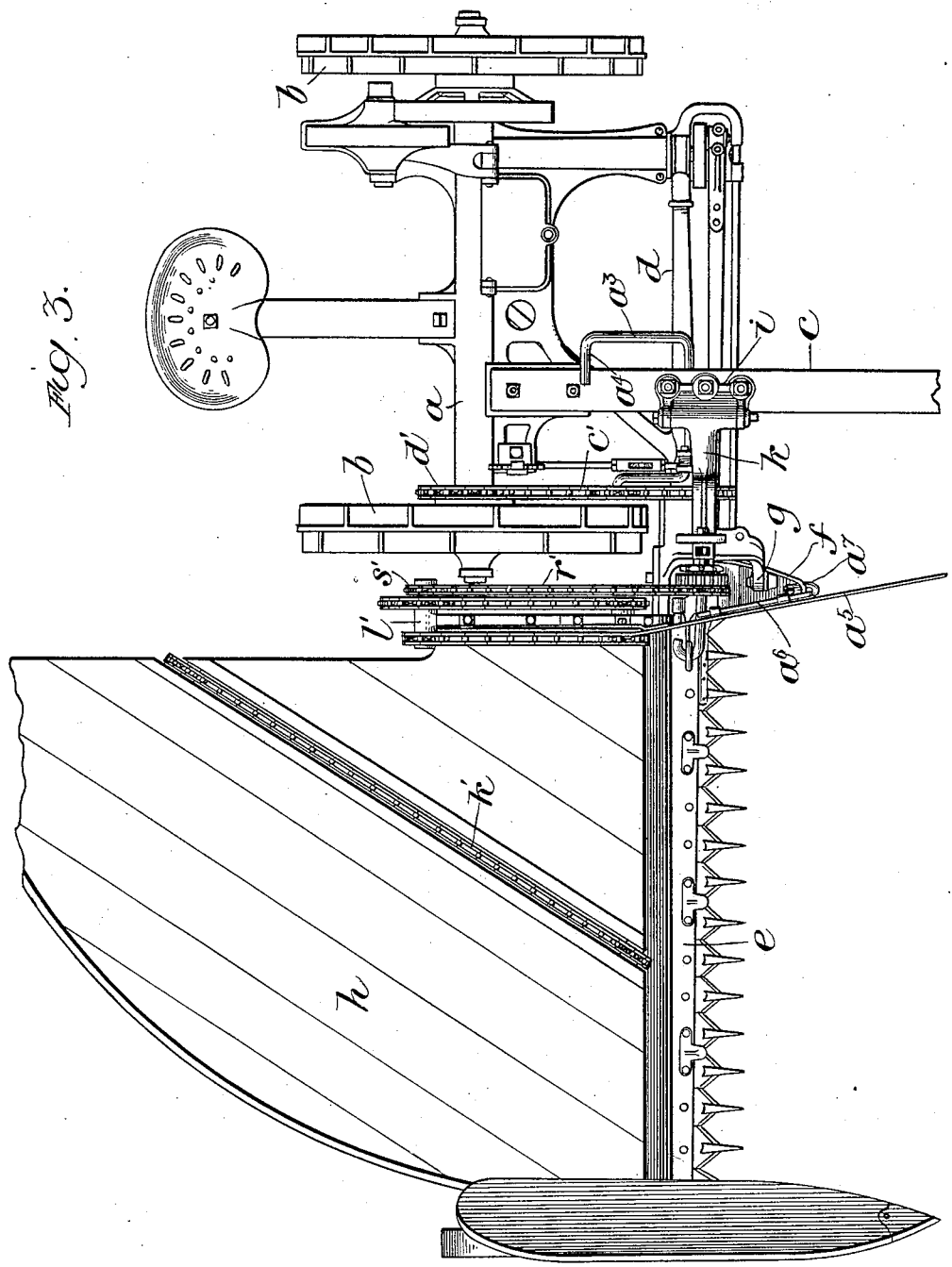

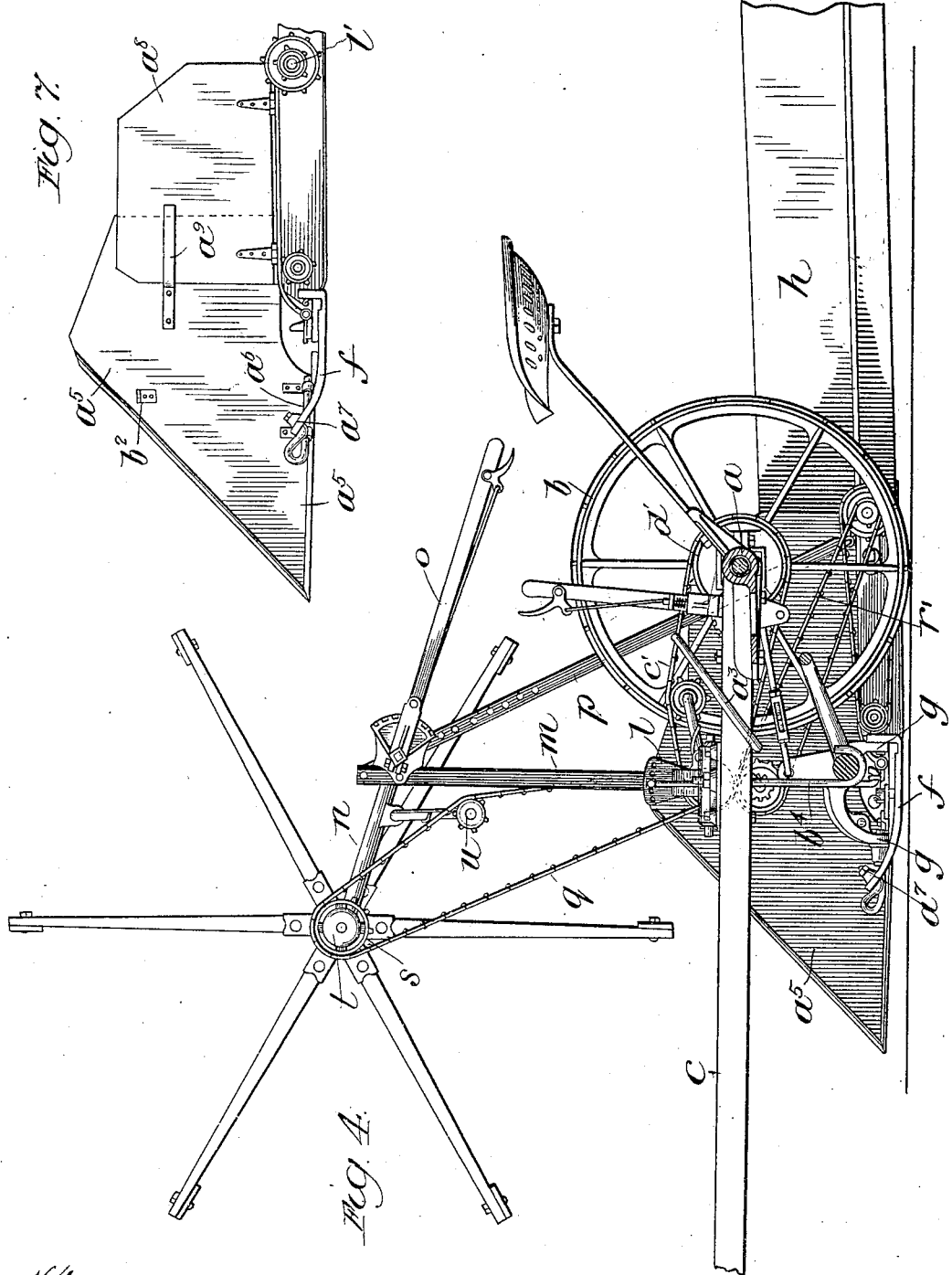

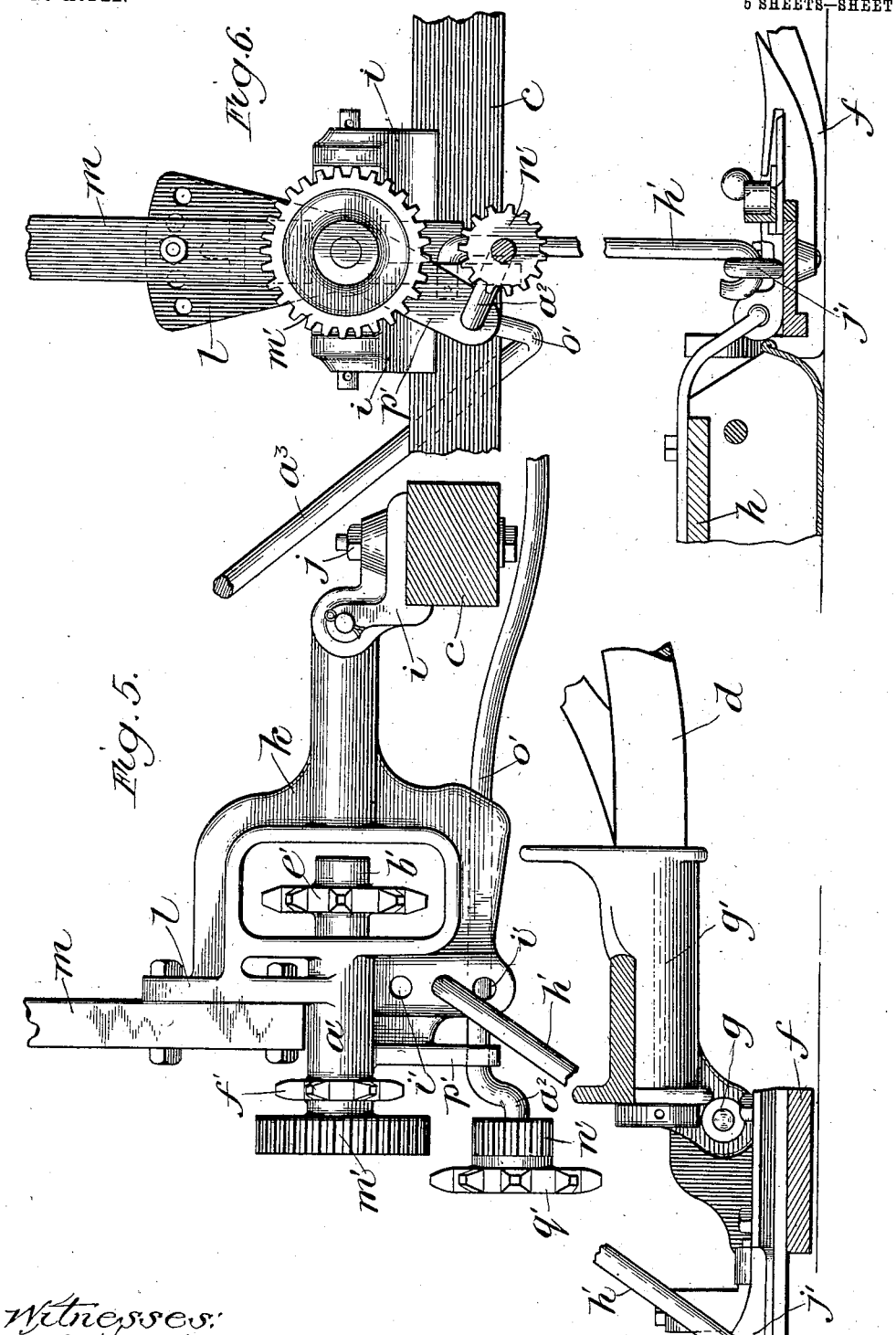

No. 763,902. Patented June 28, 1904.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

FOLDING REEL-SUPPORT FOR MOWERS.

SPECIFICATION forming part of Letters Patent No. 763,902, dated June 28, 1904.

Application filed November 30, 1903. Serial No. 183,237. (No model.)

*To all whom it may concern:*

Be it known that I, EDWARD A. JOHNSTON, a citizen of the United States, residing in Chicago, county of Cook, State of Illinois, have invented certain new and useful Improvements in Folding Reel-Supports for Mowers; and I do hereby declare the following to be a full, clear, and exact description of the invention, such as will enable others skilled in the art to which it appertains to make and use the same.

In Patent No. 728,931, granted to me May 26, 1903, I have illustrated, described, and claimed a reaping attachment for mowers whereby an ordinary mower for cutting grass, &c., may be converted into a reaper for harvesting grain and other crops. When such reaping attachments are employed and the machines are arranged for reaping, it is necessary to employ reels for performing the usual function in harvesting-machines; and the present invention has for its object to provide an arrangement whereby a reel of the usual or any preferred construction may be temporarily attached to a mower, especially when such a reaping attachment is employed as is embraced in the above-mentioned patent, where the raising and lowering of the finger-bar is not interfered with and where the bar is even adapted to be folded up into vertical position to permit the machine to be transported on its own wheels through gateways or other narrow openings.

Generally speaking, the invention consists in a reel-supporting frame adapted for detachable connection with the main frame of the mower, so that the arm may swing vertically in the plane of the finger-bar, whereby as the bar rises the frame and the reel carried by it may swing upward across the tongue of the machine in front of the driver's seat, the outer end of the supporting-frame having a connection with the finger-bar beyond its hinge-joint whereby the movements of the frame are controlled by the movements of the finger-bar.

Specifically the invention consists in the particular construction of the reel-supporting frame hereinafter described and claimed in connection with the particular manner of connecting it to the mower-frame and the finger-bar and the arrangement for disconnecting the driving mechanism of the conveyer when the parts are to be folded into vertical position for transportation.

The invention is illustrated in the accompanying drawings, wherein—

Figure 1 is a front elevation of a mower provided with a reaping attachment to which the invention is applied, showing it in its normal position. Fig. 2 is a view corresponding to Fig. 1, showing the finger-bar, reaper-platform, and the reel folded for transportation. Fig. 3 is a plan view of the parts shown in Fig. 1 with the exception that the reel and its carrying-arm are removed. Fig. 4 is a sectional side elevation showing the manner of supporting and driving the reel. Fig. 5 is a front elevation of the reel-supporting frame, showing the manner of connecting it to the tongue and the finger-bar, of which fragments are shown. Fig. 6 is a grass-side elevation of the parts shown in Fig. 5. Fig. 7 is a stubble-side elevation of the inside divider, showing the manner of hinging it to the inner shoe to permit the folding of the finger-bar.

Referring to the views, *a* denotes the main frame, *b b* the supporting-wheels, and *c* the tongue, of a mower of the usual or any preferred construction.

The coupling-arm of the machine is denoted at *d*, while *e* indicates the finger-bar, *f* the inner shoe, secured, as usual, to the coupling-arm, and *g* the usual hinged-joint connection between the finger-bar and the coupling-arm.

The reaping attachment is indicated at *h*. It is constructed and attached to the finger-bar in accordance with the patent above referred to, so that it rises and falls with the finger-bar, and when the bar is lifted into vertical position to reduce the width of the machine it folds up vertically, as indicated in Fig. 2.

Referring now to the manner of supporting the reel, *i* denotes a bracket that is detachably connected by bolts *j* or otherwise to the tongue about on a line with the finger-bar. Pivoted to this bracket is the reel-supporting frame $k$, which may be made in any form, but is preferably of the shape shown in Fig. 5. At its outer or free end it has a vertical flange $l$, to which is secured by bolts or other convenient means the vertically-extending post $m$ of the reel, the flange $l$ being preferably provided with a series of holes, into any one of which the upper bolt of the reel-post may be set, so as to vary the inclination of the post and throw the position of the reel forward or rearward with respect to the vertical plane of the cutting apparatus. Journaled at the upper end of the post is the arm $n$, which forms the immediate support for the reel, and a hand-lever $o$ is connected to the arm in the usual manner in order that the driver may raise and lower the reel without leaving his seat. A diagonal stay or prop $p$ extends from the upper end of the reel-post downward and backward to some convenient point on the reaping attachment, thus holding and supporting the attachment and the heavy parts carried thereby. The shaft of the reel is journaled in a bearing $r$, offset from the arm $n$, and a sprocket-wheel $s$, normally loose on the reel-shaft, but connected therewith by a spring-pressed friction-clutch $t$, is driven by a chain $q$, any suitable spring-tightener $u$ being provided for the chain.

The reel-supporting frame $k$ carries in a bearing $a'$ at its free end a short shaft $b'$. This shaft is driven by a chain $c'$, running over a sprocket-pinion $e'$ on the inner end of the shaft and a similar wheel $d'$ on the main axle of the machine. Near its other end outside of the reel-post the shaft $b'$ has a sprocket-pinion $f'$, and around this pinion and the sprocket $s$ on the reel-shaft carried by the arm $n$ travels the chain $q$, already described, for driving the reel.

As best shown in Figs. 1 and 5 of the drawings, the reel-supporting frame extends from the tongue toward the cutting apparatus and overhangs the yoke $g'$, to which the inner shoe is jointed, and in order to support the weight of the frame $k$ and the reel and other parts carried thereby a brace $h'$ is pivotally connected with the frame at its upper end and extends downward and outward and is pivotally attached to the finger-bar at $j''$ outside the hinge connection between the shoe and the yoke on the coupling-arm. The weight of the reel-supporting frame and all the parts carried thereby is thus divided between the main frame of the machine (through its attachment to the tongue) and the finger-bar, and in order to adjust the supporting-frame so as to preserve the desired parallel relation between the reel-arms and the finger-bar the upper end of the brace $h'$ is connected to the frame adjustably by holes $i'$, into any one of which the hooked upper end of the brace may be secured.

As clearly illustrated and described in the patent above referred to, the reaping attachment shown herein has a conveyer $k'$, which is driven from a counter-shaft $l'$, carried by the attachment. In the present arrangement this counter-shaft is driven from the short shaft $b'$, journaled in the reel-supporting frame by means of a gear-wheel $m'$ on the outer end of the shaft $b'$, which meshes with a pinion $n'$, that is loose on the end of a shaft $o'$, journaled in a downhanger $p'$ on the supporting-frame $k$, and the counter-shaft $l'$ is driven by a chain $r'$, traveling around the sprocket-wheel $q'$ and a similar wheel $s'$ on the counter-shaft. In this manner all the operative parts except the cutting apparatus are driven from the short shaft carried by the reel-supporting frame, and in order to provide for discontinuing the operation of the conveyer without stopping the action of the reel the pinion $n'$ is adapted to be disconnected from the gear-wheel $m'$ by the driver without leaving his seat. To this end the pinion $n'$ and its sprocket-wheel $q'$ are mounted on a crank portion $a^2$ of the outer end of the shaft $o'$, and the inner end of this shaft is extended stubbleward and bent upward, as shown at $a^3$ in Fig. 1, where it is provided with a treadle $a^4$ in convenient reach of the driver's foot, so that by raising the treadle he may rock the shaft $o'$ and throw the pinion $n'$ out of mesh with the wheel $m'$, and by depressing the treadle he may lift the pinion again into engagement with its driving-gear.

As will be readily understood, when the machine is used as a reaper a divider must be attached to the inner shoe. The divider is herein denoted by $a^5$, and, as here shown, it is connected to the shoe by a bar $a^6$, extending lengthwise of the divider and secured to it along its lower edge, and is bolted or otherwise detachably fastened at $a^7$ to the front end of the shoe. The divider extends rearward, as usual, and laps past the forward edge of a vertical board $a^8$, that is hinged at its lower edge to the reaper attachment, the two being held together in sliding contact by any suitable means, such as a strap $a^9$, Fig. 7, and in order to provide for the rise and fall of the finger-bar without throwing the divider into contact with the driving mechanism above described the bar $a^6$ is utilized as a pivot, and the divider is held in normal position away from the driving mechanism by a rod $a^{10}$, which is pivotally connected at $b^2$ to the divider near its upper edge and has a similar connection with the reel-post at a point above its supporting-frame.

The construction being as above described, it only remains to explain that when it is desired to raise the finger-bar and the reaping attachment into the vertical position (shown in Fig. 2) the driving-chain $r'$ should be disconnected from the sprocket-wheel $q'$, carried by the rock-shaft $o'$. The rod $a^{10}$ being then disconnected from the divider and the reel being adjusted by the handle *o* into such position that it will not be struck by the outside divider, the parts may be raised in the position shown in Fig. 2, the reel at this time being thrown over the main frame by means of the brace *h'*, which connects the reel-supporting frame with the finger-bar. It will also be necessary before lifting the finger-bar to its highest point to disconnect the chain *c'* from the sprocket-wheel *d'* on the axle of the machine.

No means are shown herein for raising the finger-bar and reaper attachment into the vertical position described, because when such heavy parts are to be lifted it is best to raise them by hand and secure the coupling-arm in the proper position by means of a hook $b^4$, depending from the tongue.

Having thus described my invention, what I claim, and desire to secure, is—

1. A reel-support for mowers, comprising a frame carring the reel and its appurtenances and pivoted at one end to permit the frame and reel to be folded over on the machine, and a supporting connection from the other end of the frame to the finger-bar.

2. A reel-support for mowers, comprising a substantially horizontal frame carrying the reel and its appurtenances and pivoted at its stubble end to the tongue so as to permit the frame and reel to be folded vertically, and a brace or supporting rod pivotally connected at its upper end to the free end of the frame and pivoted at its lower end to the finger-bar.

3. A reel-support for mowers, comprising a substantially horizontal frame carrying the reel and its appurtenances and pivoted at its stubble end to the tongue so as to permit the frame and reel to be folded vertically, a brace or supporting rod pivotally connected to the finger-bar outside its hinge-joint, and an adjustable connection between the brace and the outer end of the reel-supporting frame.

4. The combination with a mower, of a reel-supporting frame pivoted on the tongue, a reel-driving shaft journaled in the frame, a reel mounted on a post carried by the frame, and a chain connecting the reel-shaft and the driving-shaft in the supporting-frame.

5. The combination with a mower, of a reel-supporting frame pivoted on the tongue, a reel-driving shaft journaled in the frame, a chain belt connecting the shaft with a sprocket-wheel on the machine-axle, a reel mounted on a post carried by the frame, and a chain belt connecting the reel-shaft and the driving-shaft in the supporting-frame.

6. The combination with a mower, of a reel-supporting frame pivoted on the tongue, a reel-driving shaft journaled in the frame, a reel mounted on a post carried by the frame, a sprocket-pinion connected to the reel-shaft by a friction-clutch, and a chain belt connecting the pinion with the driving-shaft in the supporting-frame.

7. The combination with a mower, of a folding reaper attachment having a conveyer, a reel-supporting frame pivoted on the tongue, a reel-driving shaft journaled in the frame, a chain-belt connection for driving the shaft from the machine-axle, a counter-shaft on the reaper attachment, and gearing for driving the counter-shaft from the shaft in the supporting-frame.

8. The combination with a mower, of a folding reaper attachment having a conveyer, a reel-supporting frame pivoted to the tongue, a reel-driving shaft journaled in the frame, a chain-belt connection for driving the shaft from the machine-axle, a counter-shaft on the attachment, a rock-shaft carried by the reel-supporting frame, a sprocket-wheel journaled on the cranked end of said shaft and connected by a chain belt to the counter-shaft, gearing for driving the sprocket-wheel from the reel-driving shaft and means whereby the driver may disconnect the gearing and stop the conveyer.

9. The combination of the inner shoe of a mower, a divider-board pivoted thereto so as to fold laterally, a pivoted reel-supporting frame carrying the reel and its appurtenances, and a rod connection between the upper part of the divider and the reel-post.

10. The combination of the inner shoe of a mower, a folding reaper attachment having a conveyer, a divider-board pivoted to the shoe so as to fold laterally, a reel-supporting frame pivoted at its stubble end to the tongue and supported at its outer end by a brace from the finger-bar, said frame carrying gearing for driving the reel and conveyer, and a detachable rod connection between the upper part of the divider-board and the reel-post.

In testimony whereof I affix my signature in presence of two witnesses.

EDWARD A. JOHNSTON.

Witnesses:
WILLIAM WEBBER,
CHAS. N. CHAMBERS.